United States Patent [19]

Meixner et al.

[11] Patent Number: 4,673,758

[45] Date of Patent: Jun. 16, 1987

[54] UNSATURATED POLYESTERS

[75] Inventors: Jürgen Meixner, Krefeld; Manfred Müller, Erkelenz; Wolfgang Kremer, Kerken, all of Fed. Rep. of Germany

[73] Assignee: Baker Aktiengesellschaft, Leverkusen, Fed. Rep. of Germany

[21] Appl. No.: 793,227

[22] Filed: Oct. 31, 1985

[30] Foreign Application Priority Data

Nov. 10, 1984 [DE] Fed. Rep. of Germany ....... 3441154

[51] Int. Cl.$^4$ ..................... C07C 69/76; C07C 69/593
[52] U.S. Cl. ........................................ 560/90; 560/84; 560/85; 560/86; 560/193; 560/198; 560/199
[58] Field of Search ...................... 560/84, 85, 86, 90, 560/193, 198, 199, 89

[56] References Cited

U.S. PATENT DOCUMENTS 3,000,917 9/1961 Babayan .............................. 560/199
4,100,354 7/1978 Owen ................................... 560/89

Primary Examiner—Natalie Trousof
Assistant Examiner—Vera C. Clarke
Attorney, Agent, or Firm—Connolly and Hutz

[57] ABSTRACT

Unsaturated polyesters of defined composition with a low content of polyalkylene glycol radicals in a narrow molecular weight range can be dispersed in water without external emulsifiers. These dispersions produce, after hardening, water and chemical resistant coatings with good mechanical properties.

6 Claims, No Drawings

UNSATURATED POLYESTERS

This invention relates to air-drying $\alpha,\beta$-ethylenically unsaturated polyesters which can be dispersed in water without organic solvents and without external emulsifiers and hardened without copolymerisable monomers, a process for the production thereof and the use thereof for the production of aqueous dispersions.

Aqueous dispersions of mixtures of unsaturated polyesters are known from DE-OS 2 804 216 (=U.S. Pat. No. 4,281,068), which contain allyloxy groups and can be hardened with metal siccatives and hydroperoxides. From 5 to 50% by weight of this mixture of unsaturated polyesters consists of one or more unsaturated polyesters which contain condensed polyalkylene glycols. These polyesters function as incorporable emulsifiers. Such systems possess outstanding commercial lacquer properties and suffer only from the disadvantage that both polyesters have to be produced separately and possibly also stored separately. This disadvantage cannot be avoided by the fact that the starting materials which are necessary for both polyesters according to DE-OS 2 804 216, are polycondensed in a one pot process to one polyester; such a polyester cannot be dispersed in water without auxiliaries.

The new polyesters should not only be well dispersible but should also be processible to water and chemical-resistant coatings with good mechanical values.

It has surprisingly been found that allyloxy group-containing unsaturated polyesters of a specific composition with a low content of polyalkylene glycol radicals in a narrow molecular weight range fulfil this object.

The invention provides unsaturated polyesters with acid numbers of from 5 to 50 and viscosities (determined in the Höppler falling-ball viscosimeter according to DIN 53 015 at 20° C.) of from 5000 to 30000 mPa.s containing cocondensed radicals of A. from 0.5 to 1, preferably from 0.7 to 1 mol of at least one $\alpha,\beta$-ethylenically unsaturated dicarboxylic acid, preferably having 4 or 5 carbon atoms and B. from 0 to 0.5, preferably from 0 to 0.3 mol of one or more aliphatic, saturated dicarboxylic acids, preferably having from 3 to 10 carbon atoms, one or more cycloaliphatic, saturated or unsaturated and/or aromatic dicarboxylic acids having from 8 to 12 carbon atoms, one or more araliphatic dicarboxylic acids having from 9 to 14 carbon atoms, or mixtures thereof, whereby the sum of the components A and B is in each case made up to 1 mol, C. at least one dihydric aliphatic saturated alcohol, preferably having from 2 to 8 carbon atoms, D. trimethylolpropane diallyl ether, E. optionally one or more monohydric aliphatic saturated, cycloaliphatic or aromatic alcohols, preferably having from 4 to 16 carbon atoms and F. at least one poly-$C_2$–$C_4$-alkylene glycol, characterised in that per mol A+B, the quantities of the radicals of the component C are from 0.4 to 0.7, preferably from 0.5 to 0.6 mol, of the component D from 0.4 to 1, preferably from 0.5 to 1 mol and of the component E from 0 to 0.6, preferably from 0 to 0.5 mol, with the proviso that the sum of the radicals of the components D and E is 1 mol, that the cocondensed radicals of the component F have a molecular weight, determined as number average, of from 1000 to 2000 and are present in a quantity of from 10.5 to 13.5, preferably from 11 to 13% by weight, based on the unsaturated polyesters.

Preferred unsaturated dicarboxylic acids A are maleic acid and particularly fumaric acid.

Preferred dicarboxylic acids B are succinic acid, adipic acid, sebacic acid, phthalic acid, iso- and terephthalic acid, hexahydro- and tetrahydrophthalic acid and endomethylene tetrahydrophthalic acid.

Preferred dihydric alcohols C are ethylene glycol, propandiol-1,2; propandiol-1,3; butandiol-1,2; butandiol-1,3; butandiol-1,4; pentandiol-1,3; hexandiol-1,6 and 2-ethylhexandiol-1,6.

Preferred monohydric alcohols E are n-butanol, all hexanols, octanols and decanols, cetyl alcohol, cyclohexanol, hexahydrobenzyl alcohol, $\beta$-phenyl ethanol, preferably benzyl alcohol.

Preferred polyalkylene glycols F are polyethylene glycols.

The production of the polyesters according to the invention can take place according to known methods, for example by melt or azeotropic esterification of the alcohols and acids or the esterifiable derivatives thereof, for example the anhydrides thereof, c.f. "Methoden der Organischen Chemie" (Houben-Weyl), 4th edition, volume 14/2, Georg Thieme Verlag, Stuttgart 1961, p. 1 to 5, 21 to 33, 40 to 44.

The invention thus also provides a process for the production of the new polyesters by esterifying the components A to D, F and optionally E under an inert gas atmosphere at temperatures of from 140° to 200° C., preferably from 150° to 180° C.

In order to preserve the polyesters according to the invention from undesirable premature cross-linking, it is already recommended in the production of the polyesters to add from 0.001 to 0.1%, by weight, based on the polyesters according to the invention, of polymerisation inhibitors or antioxidants to the polyesters. Suitable stabilizers are described in "Methoden der Organischen Chemie" (Houben-Weyl), 4th edition, volume 14/1, p. 433 et seq, Georg Thieme Verlag, Stuttgart, 1961. p-Benzoquinone is, for example, particularly suitable in a concentration of from 0.01 to 0.05% by weight, based on the polyesters according to the invention.

A further object of the invention is the use of the new polyesters for the production of aqueous dispersions.

The aqueous dispersions can contain from 10 to 70% by weight, preferably from 30 to 70% by weight, based on aqueous dispersions, of the polyesters according to the invention. The production of the dispersions can take place by stirring-in water, for example by simple stirring or by means of dissolvers.

For developing a finely-divided dispersion, portionwise addition of water at temperatures below 30° C. is advantageous. Oil-in-water dispersions are formed.

The aqueous dispersions can contain necessary components for achieving particular commercial effects such as fillers, pigments, dyes, thixotropizing agents and smoothing agents, masking agents to eliminate air inhibition, dulling agents and levelling agents in usual quantities.

The aqueous dispersions are outstandingly suitable for processing on the conventional lacquer production lines equipped with casting machines. Moreover, they can be applied by rolling and spraying.

Suitable substrates are paper, cardboard, films, leather, wood, plastics materials, textiles, ceramics materials or metals.

The hardening of the products can take place by means of energy-rich radiation, such as UV light, electron or gamma rays as well as by thermal polymerisation initiators, but preferably by hardening with metal siccatives and hydroperoxides at room temperature.

By metal siccatives are to be understood iron, lead, cobalt and manganese salts of acids such as linseed oil fatty acids, tall oil fatty acids, soya fatty acids, of resin acids such as abietic acid and naphthenic acid or of acetic or isooctane acid. Cobalt octoate, cobalt naphthanate and cobalt acetate are preferred. The metal siccatives are preferably used in the form of aqueous or organic solutions in such quantities that the metal content, based on polyester, corresponds to from 0.005 to 1% by weight.

The following are given as examples of hydroperoxides: tert.-butylhydroperoxide, cumene hydroperoxide, 2,5-dimethyl hexane-2,5-hydroperoxide, cyclohexanone hydroperoxide, methyl ethyl ketone hydroperoxide, diisopropylbenzene monohydroperoxide, hydrogen peroxide. The hydroperoxides are preferably used in quantities of from 1 to 10% by weight, based on polyester.

EXAMPLES cording to König, DIN 53 157) after 24 hours lay above 100 s.

Table 2 shows comparative products and their characteristic numbers, with which no usable aqueous covering agents could be produced.

The polyester of the Comparative Example 8 contains radicals of a polyethylene glycol, the molecular weight of which is below 1000, the polyester of Comparative Example 9 contains radicals of a polyethylene glycol, the molecular weight of which is above 2000. Both polyesters cannot be converted into oil-in-water dispersions without additives.

The polyester of Comparative Example 10 contains more polyethylene glycol radicals than is permissible according to the claim. After the addition of water an opaque solution resulted. Lacquer films produced therefrom were not sufficiently water-tight after hardening.

In the polyester of Comparative Example 11, the monofunctional alcohol was partially replaced by a difunctional alcohol. After dispersing, a finely-divided dispersion resulted which, however, separated again after a few hours, although the product contained a relatively large amount of polyethylene glycol radicals.

TABLE 1

| Starting components (mol) | Examples according to the invention | | | | | | |
| --- | --- | --- | --- | --- | --- | --- | --- |
| | 1 | 2 | 3 | 4 | 5 | 6 | 7 |
| maleic acid anhydride | 1.0 | — | 1.0 | 1.0 | 1.0 | 0.8 | 1.0 |
| fumaric acid | — | 1.0 | — | — | — | — | — |
| tetrahydrophthalic acid anhydride | — | — | — | — | — | 0.2 | — |
| polyethylene glycol 1000 | — | — | — | 0.043 | — | — | — |
| polyethylene glycol 1550 | 0.03 | 0.027 | 0.027 | — | — | 0.03 | 0.027 |
| polyethylene glycol 2000 | — | — | — | — | 0.02 | — | — |
| propandiol-1,2 | 0.55 | 0.55 | — | 0.53 | 0.56 | 0.55 | 0.55 |
| ethandiol | — | — | 0.55 | — | — | — | — |
| trimethylolpropane diallyl ether | 1.0 | 1.0 | 0.6 | 0.6 | 0.6 | 0.6 | 0.6 |
| benzyl alcohol | — | — | 0.4 | 0.4 | 0.4 | 0.4 | — |
| n-hexanol | — | — | — | — | — | — | 0.4 |
| polyester properties | | | | | | | |
| polyethylene glycol content (%) | 12.2 | 11.1 | 12.8 | 12.8 | 12.0 | 13.0 | 12.5 |
| acid number | 27 | 23 | 22 | 21 | 27 | 31 | 31 |
| viscosity (mPa.s) | 16700 | 14300 | 14600 | 15600 | 15000 | 14700 | 14900 |
| drying at room temperature until wipe-resistant (min) | 97 | 65 | 99 | 100 | 100 | 130 | 100 |

The viscosity measurements were carried out in a Höppler falling-ball viscosimeter (DIN 53 015) at 20° C. The given percentage contents relate to weight.

In all the examples, the condensation was carried out in the presence of 0.02% by weight of toluhydroquinone.

The starting components listed in the following table were subjected to melt-condensation at from 160° to 180° C. under a nitrogen flow, until the given viscosity was achieved.

For the production of the dispersions, 250 g of the polyesters according to the invention of examples 1 to 7 were in each case sheared with 110 g of water in the dissolver at 8000/min for 2 minutes and then adjusted to a 50% solids content with water under stirring (1000 rmp). Oil-in water dispersions resulted.

These dispersions were treated with 2% of cobalt acetate solution (5% metal content) and 3% of a 35% aqueous hydrogen peroxide and fixed onto glass plates (wet film thickness: 90 μm).

The times for drying until resistant to wiping are set out in table 1.

All lacquer films of Examples 1 to 7 were scratch-resistant after hardening; the pendulum hardness (ac-

TABLE 2

| Starting components (mol) | Comparative Examples | | | |
| --- | --- | --- | --- | --- |
| | 8 | 9 | 10 | 11 |
| maleic acid anhydride | 1.0 | 1.0 | 1.0 | 1.0 |
| polyethylene glycol 600 | 0.075 | — | — | — |
| polyethylene glycol 1550 | — | — | 0.04 | 0.03 |
| polyethylene glycol 4000 | — | 0.01 | — | — |
| propandiol-1,2 | 0.5 | 0.57 | 0.5 | 0.7 |
| trimethylolpropane diallyl ether | 0.6 | 0.6 | 1.0 | 0.6 |
| benzyl alcohol | 0.4 | 0.4 | — | — |
| polyester properties | | | | |
| polyethylene glycol content (%) | 13.5 | 12.0 | 15.7 | 15.1 |
| acid number | 19 | 21 | 23 | 44 |
| viscosity (mPa · s) | 14300 | 14800 | 15200 | 15700 |

We claim:

1. Unsaturated polyester with acid numbers of from 5 to 50 and viscosities, determined in the Höppler drop-ball viscosimeter at 20° C. of from 5000 to 30000 mPa.s containing cocondensed radicals of (A) from 0.5 to 1 mol of at least one $\alpha,\beta$-ethylenically unsaturated dicarboxylic acid, and (B) from 0 to 0.5 mol of one or more aliphatic, saturated dicarboxylic acids, one or more cycloaliphatic, saturated or unsaturated and/or aromatic dicarboxylic acids having from 8 to 12 carbon atoms, one or more araliphatic dicarboxylic acids having from 9 to 14 carbon atoms, or mixtures thereof, whereby the sum of the components A and B is in each case made up to 1 mol, (C) at least one dihydric aliphatic saturated alcohol,
(D) trimethylolpropane diallyl ether,
(E) optionally one or more monohydric aliphatic saturated, cycloaliphatic or aromatic alcohols, and
(F) at least one poly-$C_2$-$C_4$-alkylene glycol, characterised in that per mol A + B, the quantities of the radicals of the component C are from 0.4 to 0.7 mol, of the component D from 0.4 to 1 mol and of the component E from 0 to 0.6 mol, with the proviso that the sum of the radicals of components D and E is 1 mol, that the cocondensed radicals of the component F have a molecular weight, determined as number average, of from 1000 to 2000 and are present in a quantity of from 10.5 to 13.5% by weight, based on the unsaturated polyester.

2. Polyester according to claim 1, characterised in that they contain from 0.7 to 1 mol of radicals A and from 0 to 0.3 mol of radicals B.

3. Polyester according to claim 1 characterised in that the quantity of the cocondensed radicals of the component C is from 0.5 to 0.6 mol.

4. Polyester according to claim 1, characterised in that the quantity of the cocondensed radicals of the component D is from 0.5 to 1 mol.

5. Polyester according to claim 1, characterised in that the quantity of the cocondensed radicals of the component E is from 0 to 0.5 mol.

6. Polyester according to claim 1, characterised in that the cocondensed radicals of the component F are present in a quantity of from 11 to 13% by weight, based on unsaturated polyesters.

* * * * *

UNITED STATES PATENT AND TRADEMARK OFFICE
CERTIFICATE OF CORRECTION

PATENT NO. : 4,673,758
DATED : June 16, 1987
INVENTOR(S) : Meixner et al

It is certified that error appears in the above-identified patent and that said Letters Patent is hereby corrected as shown below:

On front page in item "[73]" change the name of Assignee from "Baker Aktiengesellschaft" to correctly read --Bayer Aktiengesellschaft--.

Signed and Sealed this

First Day of December, 1987

*Attest:*

DONALD J. QUIGG

*Attesting Officer*            *Commissioner of Patents and Trademarks*